US012758835B2

(12) United States Patent
Yu

(10) Patent No.: US 12,758,835 B2
(45) Date of Patent: Oct. 13, 2026

(54) PICKLEBALL PADDLE WITH FOAM CORE VORTEX-SHAPED LINEAR STRUCTURE AND PREPARATION METHOD THEREOF

(71) Applicant: ZHEJIANG AMA SPORT GOODS CO., LTD., Jinhua (CN)

(72) Inventor: Renbing Yu, Jinhua (CN)

(73) Assignee: ZHEJIANG AMA SPORT GOODS CO., LTD., Jinhua (CN)

( * ) Notice: Subject to any disclaimer, the term of this patent is extended or adjusted under 35 U.S.C. 154(b) by 77 days.

(21) Appl. No.: 19/084,956

(22) Filed: Mar. 20, 2025

(65) Prior Publication Data

US 2025/0213941 A1 Jul. 3, 2025

(51) Int. Cl.

| | |
|---|---|
| ***A63B 59/42*** | (2015.01) |
| ***A63B 60/54*** | (2015.01) |
| ***B32B 3/12*** | (2006.01) |
| ***B32B 3/26*** | (2006.01) |
| ***B32B 5/18*** | (2006.01) |
| ***B32B 27/06*** | (2006.01) |
| ***B32B 27/12*** | (2006.01) |
| ***B32B 27/30*** | (2006.01) |
| ***B32B 27/32*** | (2006.01) |
| ***B32B 27/40*** | (2006.01) |
| *A63B 102/08* | (2015.01) |

(52) U.S. Cl.

CPC ................ *A63B 59/42* (2015.10); *B32B 3/12* (2013.01); *B32B 3/266* (2013.01); *B32B 5/18* (2013.01); *B32B 27/065* (2013.01); *B32B 27/12* (2013.01); *B32B 27/306* (2013.01); *B32B 27/32* (2013.01); *B32B 27/40* (2013.01); *A63B 2102/08* (2015.10); *A63B 2209/023* (2013.01); *A63B 2209/14* (2013.01); *B32B 2262/106* (2013.01); *B32B 2266/0278* (2013.01)

(58) Field of Classification Search

CPC ......... B32B 5/142; B32B 5/245; B32B 27/06; B32B 3/12; B32B 3/266; B32B 5/18; B32B 27/065; B32B 27/12; B32B 27/306; B32B 27/32; B32B 27/40; B32B 2262/106; B32B 2266/0278; B32B 2255/02; B32B 2307/536; B32B 2307/72; B32B 2307/744; B32B 5/02; A63B 2209/00; A63B 2209/02; A63B 59/42; A63B 2102/08; A63B 2209/023; A63B 2209/14

See application file for complete search history.

(56) References Cited

U.S. PATENT DOCUMENTS

| | | | | |
|---|---|---|---|---|
| 2025/0114674 | A1 * | 4/2025 | Hudes .................... | A63B 59/42 |
| 2025/0288878 | A1 * | 9/2025 | Barnes ................... | A63B 59/42 |
| 2026/0054142 | A1 * | 2/2026 | Dinan .................... | A63B 59/42 |

* cited by examiner

*Primary Examiner* — Howard D Brown, Jr.

(74) *Attorney, Agent, or Firm* — ScienBiziP, P.C.

(57) ABSTRACT

The present disclosure proposes a pickleball paddle with a foam core vortex-shaped linear structure and a preparation method thereof, comprising a base plate and an inner core mounted on the base plate. The inner core comprises: a core layer; a wrapping layer wrapping around exterior of the core layer; a buffer layer, which is located on one side of the wrapping layer. Wherein, the exterior of the core layer is coated with the wrapping layer, and they form an elongated structure.

16 Claims, 4 Drawing Sheets

PICKLEBALL PADDLE WITH FOAM CORE VORTEX-SHAPED LINEAR STRUCTURE AND PREPARATION METHOD THEREOF

FIELD

The present disclosure pertains to the technical field of sports equipment, and particularly relates to a pickleball paddle with a foam core vortex-shaped linear structure and a preparation method thereof.

BACKGROUND

Performance of pickleball paddles, a sports apparatus widely used in the sport of pickleball, can directly influence the ball-striking effect and performance of players of the sport. Traditional pickleball paddles are generally designed with a honeycomb structure, mostly with polypropylene as a core material. Although the design can provide a certain degree of flexibility and elasticity, Pickleball paddles available on the market may have the following issued in use:

1. insufficient ball-striking accuracy: the paddles in the traditional honeycomb structure disperse energy unevenly at the time of striking a ball, which results in relatively poor ball-striking accuracy, and the ball tends to deviate from intended direction, especially when a high force is required to strike the ball;
2. limited durability: the paddles made of traditional materials are liable to performance degradation after long-term use; especially when the paddles are used to strike the ball with high intensity. The paddles are insufficient in durability, and prone to deformation or damage.
3. poor elasticity and shock-absorbing effect: the traditional paddles have relatively simple elasticity design, so the traditional paddles cannot effectively absorb the impact force at the time of striking the ball, which causes players to experience arm fatigue easily and even wrist injuries after long-term use.

SUMMARY

The present disclosure proposes a pickleball with a foam core vortex-shaped linear structure and a preparation method thereof to solve the problems that the existing pickleball paddles are insufficient in ball-striking accuracy, inferior in durability, and poor in elasticity and shock-absorbing effect as mentioned in the background art.

The technical solution of the present disclosure is implemented as follows:

a pickleball paddle with a foam core vortex-shaped linear structure, which includes a base plate and an inner core mounted on the base plate, wherein the inner core includes:

a core layer;

a wrapping layer wrapping around exterior of the core layer;

a buffer layer, which is located on one side of the wrapping layer;

wherein, the wrapping layer is wrapped around the exterior of the core layer to form an elongated structure and the elongated structure is rolled with the buffer layer to form the inner core in a vortex-shaped structure.

Preferably, the core layer is made of a Polyurethane (PU) foam material.

Preferably, the wrapping layer is made of a carbon fiber material.

Preferably, the buffer layer is made of an Ethylene Vinyl Acetate Copolymer (EVA) material.

Preferably, the base plate is a honeycomb plate.

Preferably, the base plate is made of a polypropylene material.

Preferably, the base plate includes a mounting hole at a center of the base plate, the mounting hole extends through the base plate, and the inner core is mounted in the mounting hole.

Preferably, the base plate includes panels arranged on each of an upper surface and a lower surface of the base plate.

Preferably, the base plate includes an edge cover mounted at an edge of the base plate.

Preferably, the base plate includes an end portion, a handle and a bottom cover. The end portion extends outward and is connected to the handle, and the bottom cover is mounted at a tail end of the handle.

Preferably, a thickness of the base plate is same as a thickness of the inner core.

The present application further provides a preparation method of a pickleball paddle with a foam core vortex-shaped linear structure, the preparation method includes:

preparing materials by preparing a PU foam material as a core layer, a carbon fiber material as a wrapping layer, and an EVA material as a buffer layer;

fabricating an inner core by coating exterior of the core layer with the wrapping layer so that the core layer and the wrapping layer form an elongated structure, rolling the elongated structure with the buffer layer to form the vortex-shaped linear structure, thereby forming the inner core;

fabricating a base plate by providing a polypropylene honeycomb plate, making a mounting hole at a middle portion of the honeycomb plate, mounting the inner core in the mounting hole by hot pressing, and pressing the inner core flat;

mounting panels, a handle, and an edge cover to the base plate by pasting the base plate between two panels with glue, thereby forming a first combined entity;

fixing and sleeving the edge cover onto an outer edge of the first combined entity, thereby forming a second combined entity;

fixing and sleeving the handle onto one end of the second combined entity, i.e., fixing and sleeving the handle onto one end of the edge cover, one end of the two panels, and one end of the base plate simultaneously, thereby forming a prototype of the pickleball paddle;

placing prototype of the pickleball paddle into a mold, and performing pressure curing in a high-temperature environment, until the inner core, the panels, the handle, and the edge cover bind with the base plate; and removing the prototype of the pickleball paddle from the mold, and performing thorough cooling.

Preferably, the carbon fiber of the wrapping layer is prepared to have a weaving density of 200-300 g/m$^2$, and a warp-weft fiber density ratio of 1:1.2;

The EVA material of the buffer layer is prepared to have a Shore hardness of 55-65 HA, The PU foam material of the core layer is prepared to have a density of 0.25-0.35 g/cm$^3$.

Preferably, the mounting hole is made by laser cutting and a diameter of the mounting hole is 1.05-1.1 times a diameter of the inner core, and the mounting hole is further made including an inner wall having a serrated structure.

Preferably, a spiral angle of the inner core in the vortex-shaped linear structure is 15°-25°, and an interval between adjacent circles of a spiral line is 3-5 mm between adjacent circles, and a tail end of the spiral line extends to a position 10-15 mm away from an inner edge of the edge cover.

Preferably, process parameters of said hot pressing are as follows: a temperature of 85-95° C., a pressure of 0.8-1.2 MPa, a pressure-holding time of 90-120 seconds, and a cooling rate of not greater than 5° C./min after hot pressing.

Preferably, the panels have an outer surface coated with a nano-silica anti-slip coating, and a coating thickness of the nano-silica anti-slip coating is 20 μm-30 μm and a surface friction coefficient of the nano-silica anti-slip coating is no less than 0.85.

Preferably, a pore size of the honeycomb of the base plate is 2 mm-3 mm, a wall thickness of the honeycomb is 0.15 mm-0.25 mm, and an axis of the honeycomb is in a cross arrangement with a paddle surface at an angle of 45°.

Preferably, the wrapping layer is coated with an interface treating agent that contains a silane coupling agent after plasma surface treatment, the interface treating agent has a solid content of 8-12 wt. %, and the edge cover is made of a Thermoplastic Polyurethane (TPU) composite material reinforced with shape memory alloy wires, which have a diameter of 0.3-0.5 mm, a pre-deformation of 2-3%, and an equidistant distribution of 4-6 wires along a circumference of the edge cover.

By adopting the above technical solutions, the present disclosure achieves beneficial effects as follows:

through the inner core in the vortex-shaped linear structure, the present disclosure effectively disperses the impact force at the time of striking the ball, reduces the energy loss, and improves the accuracy and controllability in striking the ball; the combination of the carbon fiber wrapping layer and the PU foam material enhances the rigidity of the paddle, ensures more concentrated energy transfer at the time of striking the ball, and further improves the ball-striking accuracy; the EVA material as the buffer layer can effectively absorb the impact force at the time of striking the ball, reduces the shock transfer to the player's arm, and lowers fatigue and the risk of injury; due to the high strength and impact resistance of the carbon fiber material, the paddle is not prone to deformation or damage at the time of striking the ball with high intensity, and the service life of the paddle is extended significantly.

Through the high-temperature curing one-piece molding process, the present disclosure further reduces the manufacturing steps, improves the production efficiency, and ensures the quality stability of the paddle.

BRIEF DESCRIPTION OF DRAWINGS

For the sake of providing a clearer explanation of the technical solutions in the embodiments of the present application or in the prior art, a brief introduction will be given below to the figures that need using to describe the embodiments or the prior art. It is obvious that the figures described below relate to some embodiments of the present application. Without creative labor, those skilled in the art can further obtain other drawings according to these figures.

Figure 1:
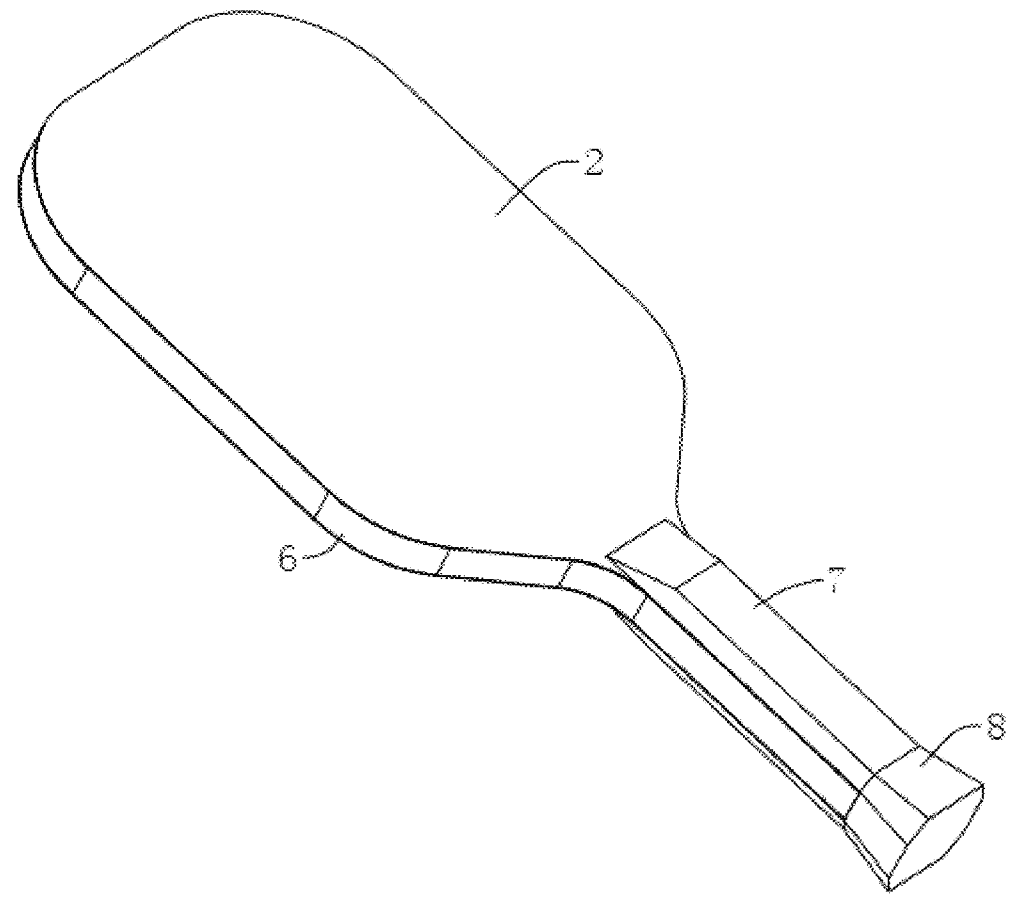
FIG. 1 is a three-dimensional diagram of an embodiment of a pickleball paddle according to the present disclosure.
Figure 2:
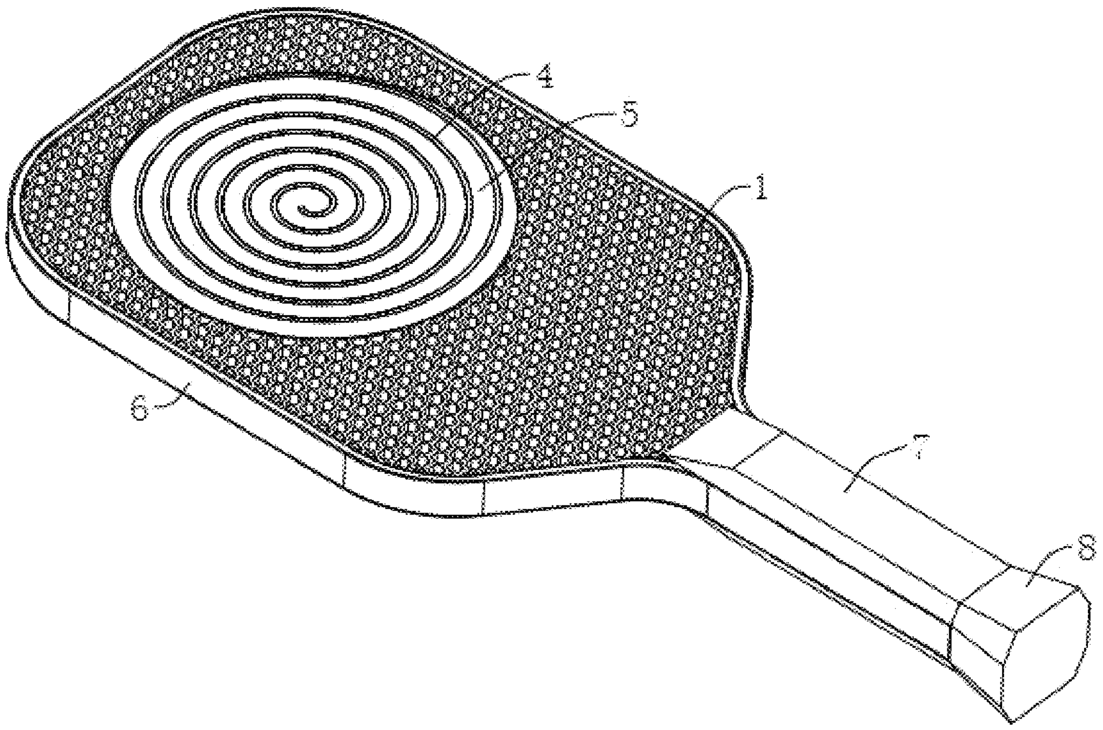
FIG. 2 is a three-dimensional diagram of the pickleball paddle shown in FIG. 1, panels of the pickleball paddle are hidden.
Figure 3:
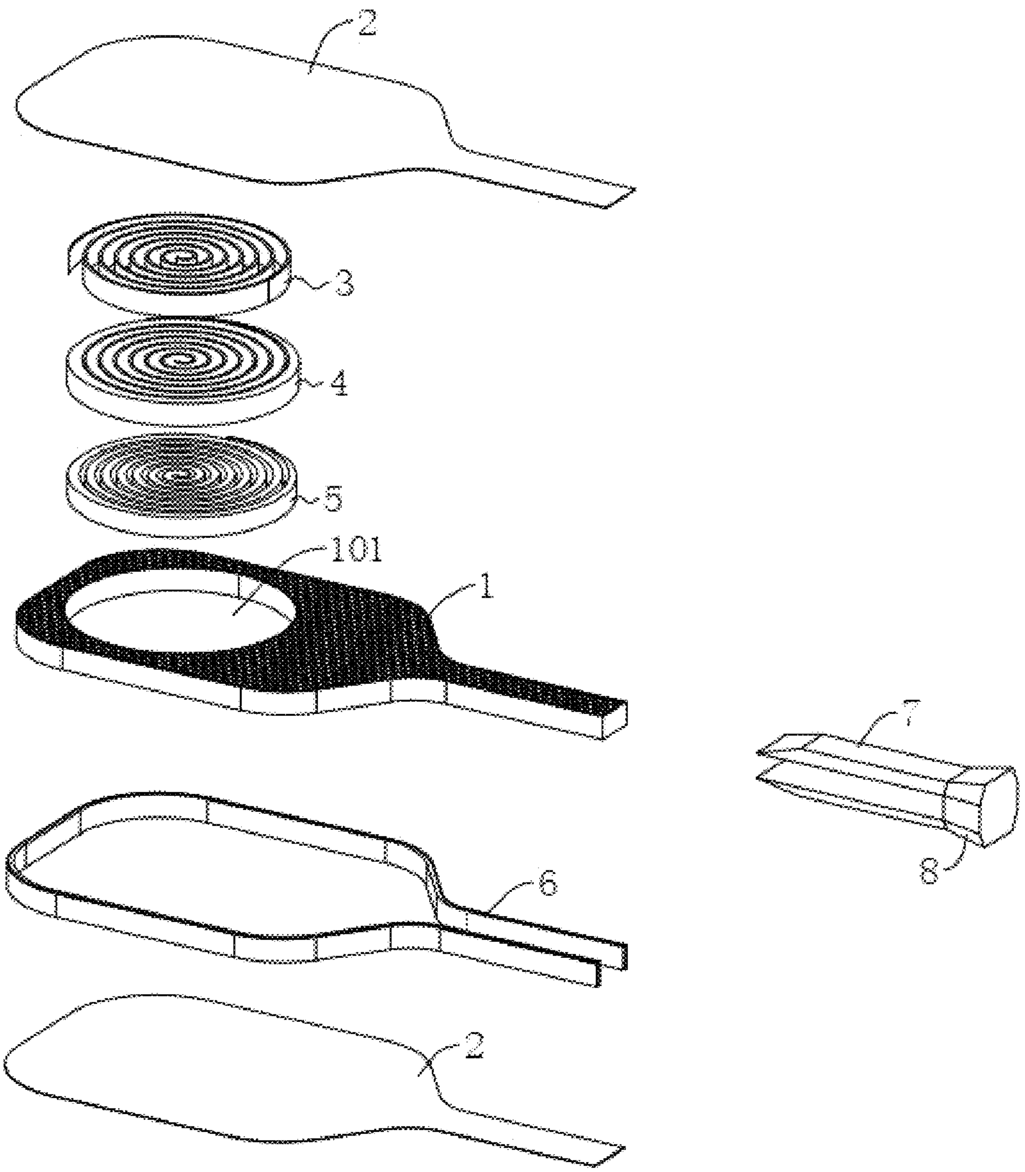
FIG. 3 is an exploded view of the pickleball paddle shown in FIG. 1.
Figure 4:
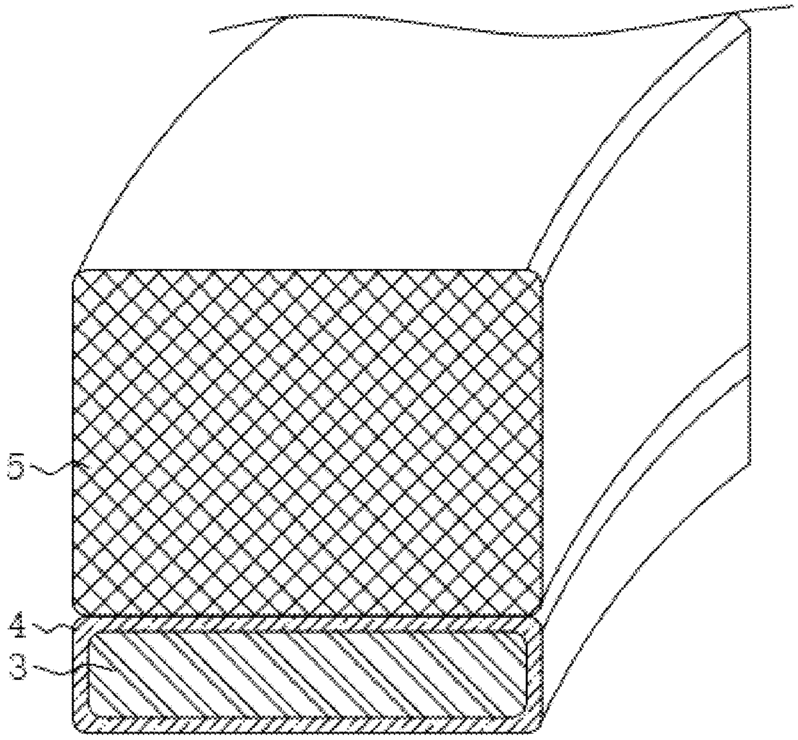
FIG. 4 is a structure diagram of an embodiment of an inner core of the pickleball paddle according to the present disclosure.

Wherein:

1. base plate; 101. mounting hole; 2. panel; 3. core layer; 4. wrapping layer; 5. buffer layer; 6. edge cover; 7. handle; 8. bottom cover.

DETAILED DESCRIPTION

In combination with the figures in the embodiments of the present disclosure, the technical solutions in the embodiments of the present disclosure will be described below in a clear and complete manner. Obviously, the described embodiments are only some of the embodiments in the present disclosure, rather than all of them. All other embodiments that those skilled in the art obtain on the basis of the embodiments of the present disclosure without creative labor fall within the scope of protection of the present disclosure.

As shown in the figures, a pickleball paddle with a foam core vortex-shaped linear structure includes a base plate 1 and an inner core mounted on the base plate 1.

Specifically, in the present embodiment, the inner core includes a core layer 3, a wrapping layer 4, and a buffer layer 5. Wherein:

the core layer 3 is made of a PU foam material, and mainly used for providing light-weight and high-elasticity properties;

the wrapping layer 4 is wrapped around the exterior of the core layer 3; the wrapping layer 4 is made of a carbon fiber material, and mainly used for being wound or wrapped around the exterior of the core layer 3 to enhance the strength and rigidity of the core layer 3;

the buffer layer 5 is located on one side of the wrapping layer 4, and made of an EVA material; in the present embodiment, the buffer layer 5 has a thickness 5-20 times the sum of the thicknesses of both the core layer 3 and the wrapping layer 4, and is used for absorbing the impact force at the time of striking the ball and reducing the shock transfer;

wherein, the wrapping layer 4 is wrapped around the exterior of the core layer 3 to form an elongated structure, and the elongated structure is rolled with the buffer layer 5 to form the inner core in a vortex-shaped structure; the inner core structure composed of the core layer 3, the wrapping layer 4, and the buffer layer 5 can effectively disperse the impact force at the time of striking the ball, and improve the rebound effect and controllability of the paddle.

In other embodiments, the core layer 3, the wrapping layer 4, and the buffer layer 5 can also be made of other materials with similar functions, and these materials are not limited herein.

In the present embodiment, the base plate 1 is a honeycomb plate made of a polypropylene material, and has the light-weight and high-elasticity properties.

Specifically, at the center of the base plate 1, a mounting hole 101 that runs therethrough is opened, and the inner core is mounted in the mounting hole 101. In other words, after the hot pressing assembly between the inner core and the base plate 1, the inner core is located at the center of the base plate 1. On the one hand, this arrangement is aimed at making the weight distribution of the entire paddle more uniform, and avoiding ball-striking deviations or poor hand feel caused by uneven weight distribution; on the other hand, as the ball is mostly struck at the central area of the paddle in the striking course, the arrangement that the inner core is at the center of the paddle can improve the ball-striking performance to a greater extent, directly absorb and transfer the impact force at the time of striking the ball, ensure that energy spreads out evenly from the center of the paddle, reduce the energy loss, and improve the accuracy and controllability in striking the ball.

Specifically, panels 2 are arranged on both upper and lower surfaces of the base plate 1, and used to enhance the overall strength and impact resistance of the paddle; an edge cover 6 is mounted at the edge of the base plate 1 to ensure the durability and shock-absorbing effect of the paddle edge; the base plate 1 has one end that extends outward and an end portion that is connected to a handle 7, and a bottom cover 8 is mounted at a tail end of the handle 7, wherein the handle 7 can be designed in different shapes according to hand shapes or usage habits of users.

In the present embodiment, the base plate 1 has the same thickness as the inner core, i.e., the thickness of the base plate 1 is equal to or slightly different from that of the inner core, to meet the production and assembly needs of different customers.

The present embodiment further provides a preparation method of a pickleball paddle with a foam core vortex-shaped linear structure, which includes:

preparing a PU foam material as a core layer 3, a carbon fiber material as a wrapping layer 4, and an EVA material as a buffer layer 5; in addition, a polypropylene honeycomb plate is further prepared as a base plate 1, fiber prepreg as panels 2, and a polyurethane foam material as an edge cover 6;

fabricating of an inner core by coating exterior of the core layer 3 with the wrapping layer 4 so that the core layer 3 and the wrapping layer 4 form an elongated structure, rolling the elongated structure with the buffer layer 5 of the EVA material to form the vortex-shaped linear structure, thereby forming the inner core;

fabricating the base plate 1 by providing the polypropylene honeycomb plate as the base plate 1, making a mounting hole at a middle portion of the base plate 1, mounting the inner core in the mounting hole 101 by hot pressing, and pressing the inner core flat; wherein, process parameters of said hot pressing are as follows: a temperature of 85-95° C., a pressure of 0.8-1.2 MPa, a pressure-holding time of 90-120 seconds, and a cooling rate of not greater than 5° C./min after hot pressing; the hot pressing process parameters for precise control ensure a tight bond between the inner core and the base plate 1, avoid structural defects caused by improper temperature or pressure, and improves the quality and consistency of the paddle;

mounting panels 2, a handle 7, and an edge cover 6 to the base plate 1 by pasting the base plate 1 between two panels 2 of the pickleball paddle with glue, thereby forming a first combined entity, and ensuring the integrity and strength of the paddle;

fixing and sleeving the edge cover 6 onto an outer edge of the first combined entity, thereby form a second combined entity; the fixing and sleeving of the edge cover 6 enhance the protection of the paddle edge, and prevent damage to the panels and the base plate in collision or friction; at the same time, the design of the edge cover enhances the aesthetic appeal and overall texture of the paddle;

fixing and sleeving the handle 7 onto one end of the second combined entity, i.e., fixing and sleeving the handle 7 onto one end of the edge cover 6, one end of the two panels 2 of the pickleball paddle, and one end of the base plate 1 at the same time; the design of fixing and sleeving the handle 7 ensures firm connection between the handle and other parts of the paddle, avoids the problem that the handle becomes loose or falls off during use; meanwhile, the design enhances the comfort and stability of the grip;

placing prototype of the pickleball paddle into a mold, and performing pressure curing in a high-temperature environment, until the inner core, the panels, the handle, and the edge cover bind with the base plate tightly; and removing the prototype of the pickleball paddle from the mold, and performing thorough cooling; the thorough cooling ensures the dimensional stability and structural strength of the paddle after solidification, and avoids deformation or stress concentration caused by temperature changes.

Specifically, the carbon fiber of the wrapping layer 4 is prepared to have a weaving density of 200-300 g/m$^2$, and a warp-weft fiber density ratio of 1:1.2; the weaving density and fiber density ratio of the carbon-fiber wrapping layer optimizes the strength and toughness of the paddle, so that the paddle is less prone to breakage under impact while keeping relatively light in weight;

the EVA material of the buffer layer 5 is prepared to have a Shore hardness of 55-65 HA; the buffer layer of the EVA material provides a good shock-absorbing effect, and can effectively absorb the impact force at the time of striking the ball, reduce the shock to the arm, and improve the comfort of use;

the PU foam material of the core layer 3 is prepared to have a density of 0.25-0.35 g/cm$^3$; with relatively low density and good elasticity, the core layer of the PU foam material further enhances the shock-absorbing performance of the paddle and reduces the overall weight thereof.

Specifically, the mounting hole 101 is made by laser cutting and a diameter of the mounting hole is 1.05-1.1 times a diameter of the inner core, and the mounting hole is further made including an inner wall having a serrated structure to enhance mechanical engagement; wherein, the mounting hole 101 molded by laser cutting has the advantage of high precision, the design of the inner wall in the serrated structure enhances the mechanical engagement between the inner core and the base plate, and prevents the inner core from becoming loose or falling off during use.

Specifically, a spiral angle of the inner core in the vortex-shaped linear structure is 15°-25°, and an interval between adjacent circles of a spiral line is 3-5 mm between adjacent circles, and a tail end of the spiral line extends to a position 10-15 mm away from an inner edge of the edge cover; the arrangement is used to optimize the mechanical performance of the paddle through the design of the spiral angle and the interval, so that the paddle can better disperse the impact force at the time of striking the ball, thereby improving the stability and durability of the paddle.

Specifically, the panels 2 have an outer surface coated with a nano-silica anti-slip coating, which has a coating thickness of 20-30 μm and a surface friction coefficient of no less than 0.85; the nano-silica anti-slip coating improves the anti-slip performance of the panels and ensures the stable grip, while enhancing the wear resistance and stain resistance of the panels, thereby extending the service life of the paddle.

Specifically, a pore size of the honeycomb of the base plate 1 is 2 mm-3 mm, a wall thickness of the honeycomb is 0.15 mm-0.25 mm, and an axis of the honeycomb is in a cross arrangement with a paddle surface at an angle of 45°;

the optimized design of the pore size and the wall thickness of the honeycomb, as well as the cross arrangement of the honeycomb axis and the paddle surface, can significantly improve the pressure resistance and impact resistance of the base plate, while reducing the weight of the paddle.

Specifically, the wrapping layer 4 is coated with an interface treating agent that contains a silane coupling agent after plasma surface treatment, the interface treating agent has a solid content of 8-12 wt. %, and the edge cover 6 is made of a TPU composite material reinforced with shape memory alloy wires, wherein a diameter of each shape memory alloy wire is 0.3 mm-0.5 mm, a pre-deformation of the shape memory alloy wire is 2-3%, and 4-6 shape memory alloy wires are equidistantly distributed along a circumference of the edge cover; wherein, the plasma surface treatment and the use of the silane coupling agent enhance the interface bonding force of the wrapping layer and improves the durability of the paddle, and the TPU composite material reinforced with shape memory alloy wires further enhances the strength and toughness of the edge cover, thereby improving the overall performance of the paddle.

The above content only relates to preferred embodiments of the present disclosure, and does not serve to limit the present disclosure. Any modifications, equivalent substitutions, and improvements among others made within the spirit and principle of the present disclosure should fall within the scope of protection of the present disclosure.

What is claimed is:

1. A pickleball paddle with a foam core vortex-shaped linear structure, comprising a base plate (1) and an inner core mounted on the base plate (1), the inner core comprising:
- a core layer (3) made of a Polyurethane (PU) foam material;
- a wrapping layer (4) made of a carbon fiber material, the wrapping layer (4) wrapping around an exterior of the core layer (3); and
- a buffer layer (5) made of an Ethylene Vinyl Acetate Copolymer (EVA) material and located on one side of the wrapping layer (4),
- wherein the wrapping layer (4) is coated on the exterior of the core layer (3) to form an elongated structure; and the elongated structure is rolled with the buffer layer (5) to form an inner core of the foam core vortex-shaped linear structure.

2. The pickleball paddle with a foam core vortex-shaped linear structure according to claim 1, wherein the base plate (1) is a honeycomb plate.

3. The pickleball paddle with a foam core vortex-shaped linear structure according to claim 2, wherein the base plate (1) is made of a polypropylene material.

4. The pickleball paddle with a foam core vortex-shaped linear structure according to claim 1, wherein the base plate (1) comprises a mounting hole at a center of the base plate (1), the mounting hole (101) extends through the base plate (1), and the inner core is mounted in the mounting hole (101).

5. The pickleball paddle with a foam core vortex-shaped linear structure according to claim 1, wherein the base plate (1) comprises panels (2) arranged on each of an upper surface and a lower surface of the base plate (1).

6. The pickleball paddle with a foam core vortex-shaped linear structure according to claim 1, wherein the base plate (1) comprises an edge cover (6) mounted at an edge of the base plate (1).

7. The pickleball paddle with a foam core vortex-shaped linear structure according to claim 1, wherein the base plate (1) comprises an end portion; a handle (7); and a bottom cover (8); the end portion extends outward, and is connected to the handle (7), and the bottom cover (8) is mounted at a tail end of the handle (7).

8. The pickleball paddle with a foam core vortex-shaped linear structure according to claim 1, wherein a thickness of the base plate (1) is same as a thickness of the inner core.

9. A preparation method of a pickleball paddle with a foam core vortex-shaped linear structure, the preparation method comprising:
- preparing materials by preparing a Polyurethane (PU) foam material as a core layer (3), a carbon fiber material as a wrapping layer (4), and an Ethylene Vinyl Acetate Copolymer (EVA) material as a buffer layer (5);
- fabricating an inner core by coating an exterior of the core layer (3) with the wrapping layer (4) so that the core layer (3) and the wrapping layer (4) form an elongated structure, rolling the elongated structure with the buffer layer to form the vortex-shaped linear structure, thereby forming the inner core;
- fabricating a base plate by providing a polypropylene honeycomb plate, making a mounting hole (101) at a middle portion of the honeycomb plate, mounting the inner core in the mounting hole (101) by hot pressing, and pressing the inner core flat;
- mounting panels (2), a handle (7), and an edge cover (6) to the base plate by pasting the base plate (1) between two panels (2) with glue, thereby forming a first combined entity;
- fixing and sleeving the edge cover (6) onto an outer edge of the first combined entity, thereby forming a second combined entity;
- fixing and sleeving the handle (7) onto one end of the second combined entity by fixing and sleeving the handle (7) onto one end of the edge cover (6), one end of the two panels (2), and one end of the base plate (1) simultaneously, thereby forming a prototype of the pickleball paddle;
- placing prototype of the pickleball paddle into a mold, and performing pressure curing in a high-temperature environment until the inner core, the panels (2), the handle (7), and the edge cover (6) bind with the base plate (1); and
- removing the prototype of the pickleball paddle from the mold, and performing thorough cooling.

10. The preparation method of a pickleball paddle with a foam core vortex-shaped linear structure according to claim 9, wherein the carbon fiber of the wrapping layer (4) is prepared to have a weaving density of 200-300 $g/m^2$, and a warp-weft fiber density ratio of 1:1.2;
- the EVA material of the buffer layer (5) is prepared to have a Shore hardness of 55-65 HA,
- the PU foam material of the core layer (3) is prepared to have a density of 0.25-0.35 $g/cm^3$.

11. The preparation method of a pickleball paddle with a foam core vortex-shaped linear structure according to claim 9, wherein the mounting hole (101) is made by laser cutting and a diameter of the mounting hole is 1.05-1.1 times a diameter of the inner core, and the mounting hole is further made comprising an inner wall having a serrated structure.

12. The preparation method of a pickleball paddle with a foam core vortex-shaped linear structure according to claim 9, wherein a spiral angle of the inner core in the vortex-shaped linear structure is 15°-25°, and an interval between adjacent circles of a spiral line is 3-5 mm, and a tail end of the spiral line extends to a position 10-15 mm away from an inner edge of the edge cover (6).

13. The preparation method of a pickleball paddle with a foam core vortex-shaped linear structure according to claim 9, wherein process parameters of said hot pressing are as follows: a temperature of 85-95° C., a pressure of 0.8-1.2 MPa, a pressure-holding time of 90-120 seconds, and a cooling rate of not greater than 5° C./min after hot pressing.

14. The preparation method of a pickleball paddle with a foam core vortex-shaped linear structure according to claim 9, wherein the panels (2) have an outer surface coated with a nano-silica anti-slip coating, and a coating thickness of the nano-silica anti-slip coating is 20 μm-30 μm and a surface friction coefficient of the nano-silica anti-slip coating is no less than 0.85.

15. The preparation method of a pickleball paddle with a foam core vortex-shaped linear structure according to claim 9, wherein a pore size of the honeycomb of the base plate (1) is 2-3 mm, a wall thickness of the honeycomb is 0.15-0.25 mm, and an axis of the honeycomb is in a cross arrangement with a paddle surface at an angle of 45°.

16. The preparation method of a pickleball paddle with a foam core vortex-shaped linear structure according to claim 9, wherein the wrapping layer (4) is coated with an interface treating agent that contains a silane coupling agent after plasma surface treatment, wherein the interface treating agent has a solid content of 8-12 wt. %, and the edge cover (6) is made of a Thermoplastic Polyurethane (TPU) composite material reinforced with shape memory alloy wires, wherein a diameter of each shape memory alloy wire is 0.3-0.5 mm, a pre-deformation of the shape memory alloy wire is 2-3%, and 4-6 shape memory alloy wires are equidistantly distributed along a circumference of the edge cover.

* * * * *